United States Patent [19]

Walsh

[11] Patent Number: 4,481,104
[45] Date of Patent: Nov. 6, 1984

[54] USE OF LOW ACIDITY HIGH SILICA TO ALUMINA RATIO LARGE PORE ZEOLITES FOR DISTILLATE PRODUCTION IN CATALYTIC CRACKING

[75] Inventor: Dennis E. Walsh, Richboro, Pa.

[73] Assignee: Mobil Oil Corporation, New York, N.Y.

[21] Appl. No.: 579,286

[22] Filed: Feb. 14, 1984

Related U.S. Application Data

[63] Continuation of Ser. No. 315,322, Oct. 26, 1981, abandoned.

[51] Int. Cl.$^3$ .................. C10G 11/05; C10G 11/18
[52] U.S. Cl. ........................................ 208/120; 502/64
[58] Field of Search .................. 208/120, 64; 502/64

[56] References Cited

U.S. PATENT DOCUMENTS

| | | | |
|---|---|---|---|
| 3,354,077 | 11/1967 | Hansford | 252/455 Z |
| 3,449,070 | 6/1969 | McDaniel et al. | 252/455 Z |
| 3,493,519 | 2/1970 | Kerr et al. | 208/120 |
| 3,506,400 | 4/1970 | Eberly et al. | 252/455 Z |
| 3,748,251 | 7/1973 | Demmel et al. | 208/120 |
| 3,937,791 | 2/1976 | Garwood et al. | 208/120 |
| 3,939,058 | 2/1976 | Plank | 208/120 |
| 4,021,331 | 5/1977 | Ciric | |
| 4,097,410 | 6/1978 | Gladrow | |
| 4,284,529 | 8/1981 | Shihabi | 208/111 |
| 4,332,699 | 6/1982 | Nozemack | 252/455 Z |

FOREIGN PATENT DOCUMENTS

| | | |
|---|---|---|
| 1059464 | 5/1963 | United Kingdom . |
| 1351035 | 10/1970 | United Kingdom . |

OTHER PUBLICATIONS

"Dealuminated Faujasite-Type Structures with SiO$_2$/Al$_2$O$_3$ Ratios Over 100", *Journal of Catalysis*, vol. 54, pp. 285-288 (1978).

*Primary Examiner*—Delbert E. Gantz
*Assistant Examiner*—Anthony McFarlane
*Attorney, Agent, or Firm*—A. J. McKillop; M. G. Gilman; J. F. Powers, Jr.

[57] ABSTRACT

A process is disclosed for the production of distillate in the catalytic cracking of gas oils utilizing a low acidity high silica-to-alumina ratio large pore zeolite which has been subjected to exchange with alkali metal ions at pH $\leq 7$.

5 Claims, No Drawings

USE OF LOW ACIDITY HIGH SILICA TO ALUMINA RATIO LARGE PORE ZEOLITES FOR DISTILLATE PRODUCTION IN CATALYTIC CRACKING

BACKGROUND OF THE INVENTION

This is a continuation of copending application Ser. No. 315,322, filed on Oct. 26, 1981 now abandoned.

This invention is directed towards a process for the catalytic cracking of gas oil into products of lower molecular weight and, more particularly, to the catalytic cracking of gas oil utilizing a catalyst which is highly active for said gas oil conversion while exhibiting low gas and coke selectivities and favoring the production of a 420° to 650° F. distillate as evidenced by a substantially lower gasoline to distillate ratio than is exhibited by commercial catalysts tested under the same conditions.

The catalysts utilized in the novel process of this invention are large pore zeolites, i.e. those materials having a pore size of at least 8 Angstrom units, having a high framework silica to alumina ratio, i.e. greater than about ~100, wherein said zeolite is used in the alkali metal form. Large pore zeolites which can be utilized in the process of this invention are zeolites Y, beta, and zeolite ZSM-20—providing that the zeolites, particularly beta and Y have been subjected to a dealuminization procedure so as to remove part of the aluminum originally present in the framework and to obtain a zeolite having a substantially higher silica to alumina ratio.

DESCRIPTION OF THE PRIOR ART

Ultra-stable zeolite Y of varying silica to alumina ratios are well known in the art and are disclosed in many U.S. patents, including U.S. Pat. Nos. 4,293,192; 3,449,070; 3,354,077; 3,493,519; 3,513,108; 3,506,400; and 4,036,739, all of which are incorporated by reference. Ultra-stable zeolite Y having a framework silica-to-alumina ratio greater than 100 is also known in the art and is described in an article entitled "DEALUMINATED FAUJASITE TYPE STRUCTURES WITH $SiO_2/AlO_2$ RATIOS OVER 100", *Journal of Catalysis*, Vol. 54, pp. 285–288 (1978), the contents of which are incorporated by reference.

SUMMARY OF THE INVENTION

The instant invention is concerned with utilizing a material such as the dealuminized faujasite Y having a high framework silica-to-alumina ratio, i.e. over ~100, (known in the prior art) and converting that material to its alkali metal form by contacting said material with a source of sodium ions in an acidic medium and thereafter utilizing said material in the catalytic cracking of gas oil to obtain a product enhanced in distillate with low coke and gas selectivities.

DESCRIPTION OF PREFERRED EMBODIMENTS

As has heretofore been stated, the novel process of this invention is concerned with zeolites which have large pores, i.e. greater than 8 Angstrom units, which are ultra-stable which have a high framework silica-to-alumina ratio, i.e. greater than ~100, and which have low acidity. As has also been disclosed, the most preferred zeolite is ultra-stable zeolite Y having a silica-to-alumina ratio greater than ~100. The catalytic cracking of gas oil with low silica-to-alumina ratio sodium Y (e.g. about 3–6) is known in the art and has been identified as being ineffective not only because of the unacceptable steam stability, but also because of poor coke and gas selectivities. Materials of this type are disclosed in an article entitled "ACIDIC CRYSTALLINE ALUMINOSILICATES" by C. J. Plank et al, I.&.E.C. PROD. RES. AND DEV. Vol 3, No. 3, September 1964.

Although this invention is concerned with materials which are steam stable, nevertheless, it is still surprising and unexpected that a high silica-to-alumina ratio Y material in its alkali metal form would have excellent coke and gas selectivities when contrasted to its low silica-to-alumina ratio counterparts. The expression "low acidity" as used throughout the specification and claims is intended to mean a zeolite which has an alpha value of no greater than ~3 and preferably no greater than ~0.3.

As is known in the art, the alpha value is an approximate indication of catalytic cracking activity of a catalyst compared to to a standard catalyst and it gives the relative rate constant (rate of normal hexane conversion per volume of oxide composition per unit time). It is based on the activity of the highly active silica-alumina cracking catalyst taken as an alpha of one. This test is described in U.S. Pat. No. 3,354,078 and in the *Journal of Catalysis*, Vol. IV, pp. 522–529 (August 1965).

In order to obtain the low alpha values of this invention, it is necessary to contact the ultra-stable high silica-to-alumina ratio large pore zeolites, in particular ultra-stable Y, with a source of alkali metal ions. The reason for this is that these materials are prepared with a final step which involves treatment of the Y zeolite with an acid and, as such, materials of this type generally have an alpha value of about ten or higher and this is simply too much activity in order to obtain the particular results of this invention.

Quite surprisingly, it has been found that if the ultra-stable high silica to alumina ratio zeolites are contacted with the source of alkali metal ions at a pH greater than 7, that the resulting zeolite simply is no longer stable and, in fact, reverts to an amorphous form.

On the other hand, if the zeolite is contacted with a source of sodium ions or other alkali metal ions at a pH less than or equal to seven; and, more particularly, at a pH of about 4 to 6, that a very stable and active catalyst is obtained. A convenient method of accomplishing this exchange is to utilize a solution of sodium nitrate. Quite obviously, other sources of sodium ions can be used with the only limitation being that the pH should range from about 4 to 6 and, more preferably, from 4 to 5. Following contact with the alkali ions, the zeolite is thereafter dried and heated in an atmosphere such as air, nitrogen, etc; at atmospheric, subatmospheric, and super-atmospheric pressures for between one and 48 hours at temperatures ranging from about 100° to 600° C.

The aluminosilicate zeolite component prepared in the foregoing manner is combined, dispersed, or otherwise intimately admixed with an inorganic oxide gel which serves as a base, binder, matrix or promoter, in such proportions that the resulting product contains from about 2 to 95% by weight and preferably about 5 to 50% by weight of the aluminosilicate in the final composite. Generally, the catalyst composition is dried between 150° F. and 600° F., and thereafter calcined in air or an inert atmosphere of nitrogen, hydrogen, helium, flue gas or other inert gas at temperatures ranging from about 500° F. to 1500° F. for periods of time ranging from 1 to 48 hours or more. It is to be understood that the active aluminosilicate component can be calcined prior to incorporation with the inorganic oxide gel.

The aluminosilicate-inorganic oxide gel compositions can be prepared by several methods wherein the aluminosilicate having a particle size less than 40 microns, preferably within the range of 2 to 7 microns, is intimately admixed with the inorganic oxide gel while the latter is in a hydrous state such as in the form of a hydrosol, hydrogel, wet gelatinous precipitate, or a mixture thereof. Thus, finely divided active aluminosilicate can be mixed directly with a siliceous gel formed by hydrolyzing a basic solution of alkali metal silicate with an acid such as hydrochloric, sulfuric, etc. The mixing of the two components can be accomplished in any desired manner, such as in a ball mill or other types of kneading mills. The aluminosilicate also may be dispersed in a hydrosol obtained by reacting an alkali metal silicate with an acid or an alkaline coagulent. The hydrosol is then permitted to set in mass to a hydrogel which is thereafter dried and broken into pieces of desired shape, or dispersed through a nozzle into a path of oil or other water-immiscible suspending medium to obtain spheroidally shaped "bead" particles of catalyst such as described in U.S. Pat. No. 2,384,946. The aluminosilicate-siliceous gel thus obtained is washed free of soluble salts and thereafter dried and/or calcined as desired.

In a like manner, the active aluminosilicate may be incorporated with an aluminiferous oxide. Such gels are well known in the art and may be prepared, for example, by adding ammonium hydroxide, ammonium carbonate, etc., to a salt of nitrate. etc., in an amount sufficient to form aluminum hydroxide which upon drying is converted to alumina. The aluminosilicate may be incorporated with the aluminiferous oxide while the latter is in the form of hydrosol, hyrogel or wet gelatinous precipitate.

The inorganic oxide gel may also consist of a plural gel comprising a predominant amount of silica with one or more metals or oxides thereof selected from the Groups IB, II, III, IV, V, VI, VII and VIII of the Periodic Table. Particular preferance is given to plural gels of silica with metal oxides of Groups IIA, IIIB and IVA of the Periodic Table wherein the metal oxide is magnesia, alumina, zirconia, beryllia, or thoria. The preparation of plural gels is well known and generally involves either separate precipitation or coprecipitation techniques in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent. Minor amounts of promoters or other materials which may be present in the composition include cerium, chromium, cobalt, tungsten, uranium, platinum, lead, zinc, calcium, magnesium, lithium, nickel and their compounds as well as silica, alumina, or other siliceous oxide combination as fines. Of course, the pH must not be allowed to go above 7 during compounding with the matrix.

A preferred embodiment is to incorporate the zeolite in the matrix and then exchange the entire composition with alkali metal ions at the pH of 7 or less as previously described.

It has been further found in accordance with the invention that catalysts of improved activity and having other beneficial properties in the conversion of hydrocarbons are obtained by subjecting the treated aluminosilicate to a steam treatment carried out at elevated temperatures of 800° F. to 1500° F., preferably at temperatures of about 1000° F. to 1300° F. The treatment may be accomplished in an atmosphere of 100% steam or in an atmosphere consisting of steam and a gas which is substantially inert to the aluminosilicate. The steam treatment apparently provides beneficial properties in the aluminosilicate.

It is particularly preferred, however, that the matrix with which the low activity high silica-to-alumina ratio large pore zeolite be composited is one which is substantially inert to catalytic cracking, i.e. it also has an extremely low alpha. Matrices of this type are well known in the art and include alumina, silica, etc. A preferred matrix for the novel process of this invention is an alumina matrix.

Cracking operations carried out with the catalyst prepared in accordance with this invention are effective at temperatures ranging from about 700° F. to about 1200° F. under reduced, atmospheric or superatmospheric pressures. The catalyst can be utilized in the form of spheroidal particles or beads disposed in a stationary bed, fixed fluid bed, or in the fluid procedures where the catalyst is disposed in a reaction zone to which the catalyst is continuously added and from which the catalyst is continuously removed. A particularly effective cracking process can be achieved when the catalyst is used to obtain the inherent advantages realized in fluid catalytic processes.

The following examples will illustrate the novel process of this invention. In the Examples which follow, the charge utilized was a sour heavy gas oil having the following properties:

| THE FEED Properties of 650° F.+ Joliet Sour Heavy Gas Oil | |
|---|---|
| C (wt. %) | 85.65 |
| H (wt. %) | 12.13 |
| O (wt. %) | 0.30 |
| N (wt. %) | 0.09 |
| S (wt. %) | 2.15 |
| Ash (wt. %) | 0.01 |
| Ni ppm | 0.5 |
| V ppm | 0.5 |
| CCR (wt. %) | 0.44 |
| 420° F.− (wt. %) | 0.0 |
| 420-650° F. (wt. %) | 3.5 |
| 650-850° F. (wt. %) | 52.2 |
| 850° F.+ (wt. %) | 44.3 |

THE CATALYSTS

CATALYST A

A high silica-to-alumina ratio ultra-stable Y zeolite was produced by subjecting commercially available sodium Y (silica-to-alumina ratio of about five) to the procedure described in Journal of Catalysis, Vol. 54, pp. 285-288, 1978, previously referred to. This procedure involved contacting said zeolite Y with a source of ammonium ions followed by deep-bed calcination at 760° C. and re-exchange to the ammonium form. The material is again deep-bed calcined at 815° C. followed by treating this material with two-molar hydrochloric acid at 90° C. for two and one-half hours. The material obtained had 90% of the crystallinity of the starting sodium Y and had an overall silica-to-alumina ratio of 131. Ammonia desorption studies revealed that the effective silica-to-alumina ratio based on framework aluminum was about 283. This material had an alpha of about 9.0.

CATALYST B

Catalyst B was prepared by subjecting Catalyst A to sodium base exchange using sodium bicarbonate at a pH of 8 to 9. The resulting material was amorphous and had an alpha value of about 0.01.

CATALYST C

Catalyst C was prepared by subjecting Catalyst A to sodium exchange utilizing an aqueous solution of sodium nitrate at a pH of 4 to 5. This treatment resulted in a material which had its sodium content raised from about 70 ppm (Catalyst A) to about 0.4 weight percent. This material retained about 90% of the crystallinity of original low silica-to-alumina ratio sodium Y than had an alpha value of about 0.1.

CATALYST D

Catalyst D was prepared in a manner similar to Catalyst A, with the exception that treatment with hydrochloric acid was carried out for twenty minutes as opposed to 2½ hours. The resulting composition had an overall silica-to-alumina ratio of 56, and a framework silica-to-alumina ratio of about 118 as determined by ammonia absorption. It had a crystallinity of about 90% of the starting low silica-to-alumina ratio zeolite Y.

CATALYST E

Catalyst E was prepared by subjecting Catalyst D to alkali metal exchange with a sodium nitrate solution at a pH of 4 to 5. Material was obtained which had good crystallinity retention (>90% vs. the low Si/Al NaY parent) and an alpha value less than 0.1.

CATALYST F

Catalyst F was prepared in a manner similar to Catalyst A, with the exception that a five normal hydrochloric acid solution was utilized as opposed to a two normal solution, and contact was carried out for five hours and the entire procedure was repeated an additional two times. A material was obtained which had 90% of the crystallinity of the starting material, had a framework silica-to-alumina ratio approaching infinity and an overall silica-to-alumina ratio of 168. The alpha value of this material was 0.2.

Catalysts A, B, C, E and F were evaluated for the catalytic cracking of gas-oil as well as a conventional sodium Y having a silica-to-alumina ratio of 5, a control which contained no catalyst but merely contained Vycor chips, and a commercial equilibrium catalyst comprising about 10% rare earth exchanged zeolite Y having a silica-to-alumina ratio of about 5 in a silica-alumina matrix (identified as 75F). Also, a physical mixture of 12% REY and γ-alumina, steamed at 1400° F. for 4 hours (100% steam) to simulate equilibrium catalyst conditions was tested.

Catalysts A, B, C, E and F were pelleted with γ-alumina (65% zeolite, 35 wt. % alumina). When the sodium form of the catalyst was utilized, the alumina was pretreated at a pH of 8 to 9 with sodium bicarbonate. When a catalyst was run in the acid form, e.g. catalyst A, the γ-alumina used during pelleting was not sodium treated.

EXAMPLES 1 AND 2

Over the range of conditions investigated, shown in the tables below, (Net 650° F.±coke) background conversion, ascertained by reacting feed over Vycor chips, was 10 wt. % or less. When alkali metal exchange of high silica/alumina ratio was attempted at pH>7, an amorphous material resulted which was no more active than Vycor.

EXAMPLES 3–15

A 650° + sour heavy gas oil previously described was catalytically cracked over various catalysts in a fluidized bed reactor at temperatures of about 505±5° C. and at atmospheric pressures. Weight hourly space velocities (WHSV) ranged from about 1.5 to 5.8. In cyclic runs, ten minute cracking intervals were employed—each cracking interval being followed by a catalyst regeneration period. Continuous runs cracked charge for 100 minutes prior to coke removal.

The results obtained, as well as additional operating perameters, are shown in the following table:

TABLE 1

650° F.+ Joliet Sour Heavy Gas Oil Cracking Over Na or H Zeolite Y
Cracking Time: 10 min. (except where noted)
Temperature, 505° C.; Pressure, 1 atm.

| Example | Charge | 3 | 4 | 5 |
|---|---|---|---|---|
| Catalyst | | A | C | C |
| Framework SiO$_2$/Al$_2$O$_3$ | | 283 | 283 | 283 |
| Acidity (α) | | 9 | 0.1 | 0.1 |
| WHSV$^a$ | | 3.0 | 3.0 | 1.5 |
| Cat/Oil (wt/wt)$^b$ | | 2.0 | 2.0 | 4.0 |
| Products (wt. %) | | | | |
| C$_3$- | — | 9.3 | 4.4 | 6.6 |
| C$_4$'s | — | 10.8 | 3.5 | 1.6 |
| C$_5$-420° F. | — | 44.5 | 29.8 | 42.2 |
| 420–650° F. | 3.5 | 17.9 | 27.5 | 23.6 |
| 650–850° F. | 52.2 | 9.4 | 22.2 | 17.5 |
| 850° F.+ | 44.3 | 4.0 | 9.4 | 4.2 |
| Coke | — | 4.1 | 3.2 | 4.3 |
| (net 650° F.− + coke) Conversion (wt. %)$^c$ | — | 86.1 | 67.2 | 77.5 |
| Selectivities | | | | |
| Gas | | 24.2 | 12.2 | 11.0 |
| Coke | | 4.9 | 4.9 | 5.7 |
| C$_5$-420° F. (G) | | 53.6 | 46.0 | 56.4 |
| 420–650° F. (D) | | 17.3 | 37.0 | 26.9 |
| G/D | | 3.1 | 1.2 | 2.1 |

| Example | 6$^d$ | 7 | 8 |
|---|---|---|---|
| Catalyst | C | F | E |
| Framework SiO$_2$/Al$_2$O$_3$ | 283 | "∞" | 118 |
| Acidity (α) | 0.1 | .2 | <0.1 |
| WHSV$^a$ | 3.0 | 3.0 | 3.0 |
| Cat/Oil (wt/wt)$^b$ | 2.0 | 2.0 | 2.0 |
| Products (wt. %) | | | |
| C$_3$- | 2.2 | 4.2 | 5.0 |
| C$_4$'s | 0.8 | 3.8 | 2.1 |
| C$_5$-420° F. | 36.6 | 19.6 | 27.8 |
| 420–650° F. | 26.4 | 24.5 | 29.7 |
| 650–850° F. | 25.5 | 37.2 | 26.0 |
| 850° F.+ | 6.6 | 7.6 | 5.7 |
| Coke | 1.9 | 3.1 | 3.7 |
| (net 650° F.− + coke) Conversion (wt. %)$^c$ | 66.7 | 53.6 | 67.2 |
| Selectivities$^g$ | | | |
| Gas | 4.6 | 15.5 | 11.0 |
| Coke | 3.0 | 6.0 | 5.7 |
| C$_5$-420° F. (G) | 56.8 | 37.9 | 42.9 |
| 420–650° F. (D) | 35.6 | 40.6 | 40.4 |
| G/D | 1.6 | 0.9 | 1.1 |

| Example | 9$^e$ | 10 | 11 |
|---|---|---|---|
| Catalyst | E | E | NaY |
| Framework SiO$_2$/Al$_2$O$_3$ | 118 | 118 | 5 |

TABLE 1-continued

650° F.+ Joliet Sour Heavy Gas Oil Cracking Over
Na or H Zeolite Y
Cracking Time: 10 min. (except where noted)
Temperature, 505° C.; Pressure, 1 atm.

| Acidity ($\alpha$) | <0.1 | <0.1 | <.1 |
|---|---|---|---|
| WHSV$^a$ | 3.0 | 5.8 | 3.0 |
| Cat/Oil (wt/wt)$^b$ | 0.2 | 1.0 | 2.0 |
| Products (wt. %) | | | |
| C$_3$- | 5.3 | 4.2 | ⎰ 16.9 |
| C$_4$'s | 1.5 | 1.6 | ⎱ |
| C$_5$-420° F. | 26.7 | 16.8 | 40.2 |
| 420–650° F. | 28.3 | 26.2 | 20.1 |
| 650–850° F. | 29.1 | 37.2 | 6.0 |
| 850° F.+ | 7.8 | 11.1 | 2.2 |
| Coke | 1.3 | 2.9 | 14.6 |
| (net 650° F.− + coke) Conversion (wt. %)$^c$ | 61.8 | 49.9 | 91.5 |
| Selectivities | | | |
| Gas | 11.4 | 12.0 | 19.1 |
| Coke | 2.2 | 6.0 | 16.6 |
| C$_5$-420° F. (G) | 44.8 | 34.8 | 45.5 |
| 420–650° F. (D) | 41.6 | 47.1 | 18.8 |
| G/D | 1.1 | 0.7 | 2.4 |

TABLE 2

650° F.+ Joliet Sour Heavy Gas Oil Cracking Over Equilibrium Commercial 75F or REY + α-Alumina
Cracking Time: 10 min. (except where noted)
Temperature, 505° C.; Pressure, 1 atm.

| Example | 12 | 13 | 14 | 15 |
|---|---|---|---|---|
| Catalyst | 75 F | 75 F | 75 F | Stmd. REY+ Al |
| Framework SiO$_2$/Al$_2$O$_3$ | — | — | — | — |
| Acidity ($\alpha$) | 0.4 | 0.4 | 0.4 | — |
| WHSV$^a$ | 2.2 | 5.3 | 6.6 | 4.2 |
| Cat/Oil (wt/wt)$^b$ | 2.7 | 1.1 | 0.9 | 1.4 |
| Products (wt. %) | | | | |
| C$_3$- | 6.0 | 4.2 | 2.7 | ⎰ 4.4 |
| C$_4$'s | 4.3 | 2.3 | 1.8 | ⎱ |
| C$_5$-420° F. | 55.7 | 37.9 | 26.5 | 40.9 |
| 420–650° F. | 17.6 | 21.7 | 21.0 | 21.8 |
| 650–850° F. | 11.3 | 22.3 | 36.7 | ⎰ 28.6 |
| 850° F.+ | 2.8 | 9.2 | 9.4 | ⎱ |
| Coke | 2.3 | 2.4 | 1.9 | 4.3 |
| (net 650° F.− + coke) Conversion (wt. %)$^c$ | 85.4 | 67.4 | 52.2 | 70.3 |
| Selectivities | | | | |
| Gas | 12.5 | 10 | 8.9 | 6.5 |
| Coke | 2.8 | 3.7 | 3.8 | 6.3 |
| C$_5$-420° F. (G) | 67.6 | 58.3 | 52.6 | 60.2 |
| 420–650° F. (D) | 17.1 | 28.0 | 34.7 | 27.0 |
| G/D | 4.0 | 2.1 | 1.5 | 2.2 |

$^a$Based on weight of catalyst in the bed (i.e. zeolite + gamma alumina)
$^b$Weight of catalyst divided by weight of oil pumped prior to regeneration.
$^c$(Net 650° F.− liquids + gas + coke)/(650° F.+ charge).
$^d$Catalyst used in Examples 4 and 5 was steamed at 1400° F., 4 hrs, 100% steam and used in Example 6.
$^e$Continuous run - no periodic regeneration: 100 minutes cracking time.

The results depicted in the above table show the high conversion activity of the equilibrium commercial catalyst (75F-Example 12) and its preference for gasoline production, i.e. about 68% naphtha selectivity and gasoline to distillate (G/D) of about 4.0. The table also shows that a conventional low silica-to-alumina ratio sodium zeolite Y, i.e. (Example 11) operating at the same conversion level as 75-F, (~85–90%) produced excessive amounts of coke and gas as is obvious from the combined coke and gas selectivities which exceeded 35%. Also the G/D ratio exceeds 2.

Producing an ultra-stable zeolite Y having a high silica-to-alumina ratio and testing this material in the acid form (Example 3) showed that it had about the same activity at the same operating conditions as the low silica-to-alumina sodium Y, i.e. Example 11, but, though it provided much reduced coke selectivity, its gas selectivity was still quite high and the gasoline to distillate ratio (G/D) exceeded three.

However, when the catalysts prepared in accordance with the process of this invention viz. alkali metal exchange in an acidic solution, i.e. Catalysts C and E, were used much improved gas and coke selectivities were obtained and distillate production was greatly enhanced compared to the commercial catalyst at the same conversion level (Example 4 vs. Example 13 and Example 10 vs. Example 14).

Example 8 demonstrates that the framework silica-to-alumina ratio is not narrowly critical once it is over ~100. Thus, for example, the results of Example 8 having a framework silica-to-alumina ratio of 118 are very similar to Example 4 which had a framework silica-to-alumina ratio of 283.

When the catalyst from Example 8 was used in a repeat experiment under the same conditions but run continuously without periodic regeneration, i.e. Example 9, results similar to Examples 8 and 4 were obtained indicating little or no catalytst deactivation with the high Si/Al alkali metal exchanged catalysts. In an attempt to avoid alkali metal exchange to produce low acid activity ($\alpha$), Example 7 was run wherein the catalyst had substantially no measurable framework aluminum. Nevertheless, as can be seen, the product distribution from Example 7 indicated somewhat higher gas and naphtha selectivities and lower distillate at about the same conversion level as a high Si/Al Na exchanged Y (Example 10). These results indicate a preference for alkali metal exchange over high Al removal to obtain low acidity.

In order to demonstrate the steam stability of the high silica-to-alumina ratio sodium Y zeolites, the catalyst which had been used in Examples 4 and 5 was subjected to steaming at 1400° F. for four hours at 100% steam. This treatment simulates the attainment of an "equilibrium" catalyst condition characteristic of commercial unit operation. X-ray analysis of the steamed catalyst revealed no apparent crystallinity loss compared to its unused, unsteamed high silica-to-alumina ratio sodium Y counterpart. When this material was used in Example 6, it did not exhibit any activity loss vs. Example 4 at the same operating conditions. In fact, compared to Example 4, this material exhibited a somewhat enhanced naphtha selectivity at the expense of gas and coke, distillate selectivity remaining essentially unchanged, indicating that steaming not only did not hurt the catalyst but may actually have improved its performance.

REY in conjunction with either silica alumina or γ-alumina performs similarly at similar conversion levels (Examples 13 and 15). Though gas and coke selectivities differ somewhat, gas plus coke selectivity is about the same for both examples as are the individual naphtha and distillate selectivities. Thus, the advantages observed for alkali metal exchanged high silica/alumina ratio ultra stable Y compared to REY cataysts at the same conversion level (Examples 4, 6 and 8 vs. Examples 13 and 15) are not the result of influences due to the non-zeolite catalyst component.

What is claimed is:

1. In the process for the catalytic cracking of gas oil to produce products boiling in the naphtha and distillate fuel range wherein said gas oil is contacted at elevated temperatures over a catalyst comprising a zeolite, the improvement which comprises utilizing as a catalyst a composition comprising a matrix and a crystalline aluminosilicate zeolite, said crystalline aluminosilicate zeolite being characterized by
(1) a framework silica-to-alumina ratio greater than ~100;
(2) a pore size greater than about at least 8 Angstrom units;
(3) an alpha value no greater than 3 as a result of said zeolite having had its activity reduced by treatment of the same with alkali metal cations at a pH of from 4 to 6.

2. The process of claim 1 wherein said large pore crystalline aluminosilicate zeolite is selected from the group consisting of zeolite Y, zeolite beta, and zeolite ZSM-20.

3. The process of claim 2 wherein said zeolite is zeolite Y.

4. The process of claim 3 wherein said zeolite Y has been treated with a solution of sodium nitrate.

5. The process of claim 1 wherein the pH is from 4 to 5.

* * * * *